US009609797B2

(12) United States Patent
Dietrich, Sr.

(10) Patent No.: US 9,609,797 B2
(45) Date of Patent: Apr. 4, 2017

(54) AGRICULTURAL IMPLEMENT WITH PIVOTING TOOL FRAME

(71) Applicant: CNH America LLC, New Holland, PA (US)

(72) Inventor: Willliam J. Dietrich, Sr., Goodfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/666,736

(22) Filed: Nov. 1, 2012

(65) Prior Publication Data
US 2014/0116736 A1  May 1, 2014

(51) Int. Cl.
A01B 63/32 (2006.01)
A01B 61/04 (2006.01)

(52) U.S. Cl.
CPC ............ A01B 61/044 (2013.01); A01B 63/32 (2013.01)

(58) Field of Classification Search
CPC ............................... A01B 63/32; A01B 21/083
USPC ................................................. 172/482, 668
See application file for complete search history.

(56) References Cited

U.S. PATENT DOCUMENTS

| 1,241,775 | A |   | 10/1917 | Shemwell |          |
|-----------|---|---|---------|----------|----------|
| 2,268,055 | A |   | 12/1941 | Neisingh |          |
| 2,420,973 | A |   | 5/1947  | Petersen |          |
| 2,640,307 | A |   | 6/1953  | Robertson|          |
| 2,692,542 | A | * | 10/1954 | Bell     | 172/455  |
| 2,729,929 | A |   | 1/1956  | Mason    |          |
| 2,907,394 | A | * | 10/1959 | Cook     | 172/7    |
| 4,333,534 | A |   | 6/1982  | Swanson et al. |    |
| 4,407,207 | A | * | 10/1983 | Dreyer   | 111/136  |
| 4,444,271 | A | * | 4/1984  | Dietrich, Sr. | 172/140 |
| 4,454,920 | A |   | 6/1984  | Dietrich, Sr. |    |
| 4,535,849 | A | * | 8/1985  | Dietrich, Sr. | 172/468 |
| 4,546,832 | A | * | 10/1985 | Dietrich et al. | 172/260.5 |
| 4,624,196 | A |   | 11/1986 | Anderson |          |
| 4,779,684 | A |   | 10/1988 | Schultz  |          |
| 5,080,178 | A |   | 1/1992  | Dietrich, Sr. |    |

(Continued)

FOREIGN PATENT DOCUMENTS

| EP | 1310144 A2 | 5/2003  |
|----|------------|---------|
| GB | 2043419 A  | 10/1980 |
| GB | 2184332 A  | 6/1987  |

Primary Examiner — Thomas B Will
Assistant Examiner — Joel F. Mitchell
(74) Attorney, Agent, or Firm — Rebecca L. Henkel; Rickard K. DeMille

(57) ABSTRACT

An agricultural implement may include a main frame with a tool frame pivotally coupled thereto. The agricultural implement includes a front row of ground engaging tools having a first plurality of ground engaging tools coupled to the tool frame and a rear row of ground engaging tools having a second plurality of ground engaging tools coupled to the tool frame. The agricultural implement includes a front linkage assembly extending between the main frame and the tool frame. The front linkage assembly is coupled to the tool frame vertically above the front row. The agricultural implement also includes a central linkage assembly extending between the main frame and the tool frame. The central linkage assembly is coupled to a central portion of the tool frame between the front row and the rear row. The front row is configured to pivot upwardly and downwardly relative to the rear row.

17 Claims, 5 Drawing Sheets

(56) References Cited

U.S. PATENT DOCUMENTS

| | | | |
|---|---|---|---|
| 5,458,203 A | 10/1995 | Evers | |
| 5,535,832 A * | 7/1996 | Benoit | 172/195 |
| 5,590,721 A * | 1/1997 | Van Mill | 172/138 |
| 5,878,821 A | 3/1999 | Flenker et al. | |
| 5,957,217 A | 9/1999 | Gunnink | |
| 6,119,791 A | 9/2000 | Mansur | |
| 6,276,462 B1 | 8/2001 | Dietrich, Sr. | |
| 6,557,646 B1 * | 5/2003 | Hurtis et al. | 172/156 |
| 6,612,381 B2 * | 9/2003 | Powell et al. | 172/586 |
| 7,044,070 B2 | 5/2006 | Kaster et al. | |
| 7,204,319 B2 | 4/2007 | Hoehn et al. | |
| 7,578,356 B2 * | 8/2009 | Newman | 172/572 |
| 7,743,844 B2 * | 6/2010 | Kovach et al. | 172/261 |
| 2006/0021768 A1 | 2/2006 | Ankenman | |
| 2009/0056962 A1 | 3/2009 | Martin et al. | |

* cited by examiner

AGRICULTURAL IMPLEMENT WITH PIVOTING TOOL FRAME

BACKGROUND

The invention relates generally to agricultural implements and, more particularly, to an agricultural implement with a pivoting tool frame.

It is well known that to enhance agricultural performance from a piece of land, a farmer cultivates the soil, typically through a tilling operation. Common tilling operations include plowing, harrowing, and sub-soiling. Modern farmers perform these tilling operations by pulling a tilling implement behind a motorized tractor or other work vehicle. Depending on the crop selection and the soil conditions, a farmer may perform several tilling operations at different times over a crop cycle to properly cultivate the land to suit the crop choice. In one type of tilling operation, rows of ground engaging tools are pulled through soil to break up clods or lumps of soil, as well as old plant material, to provide a more amenable soil structure for planting, and to level the soil surface.

Certain implements may include a front row of ground engaging tools and a rear row of ground engaging tools connected to a single frame. As may be appreciated, in such conventional implements when one row of ground engaging tools contacts an obstacle, such as a large rock, both the front row of ground engaging tools and the rear row of ground engaging tools may be raised above the soil surface. Consequently, the frame may be loaded with the full weight of the front row of ground engaging tools and the rear row of ground engaging tools, which may be substantial (e.g., up to 8,000 pounds, or more). Unfortunately, such substantial loading may reduce longevity of the frame.

BRIEF DESCRIPTION

In one embodiment, an agricultural implement includes a main frame configured to be coupled to a tow vehicle and a tool frame pivotally coupled to the main frame. The agricultural implement also includes a front row of ground engaging tools having a first plurality of ground engaging tools coupled to the tool frame and a rear row of ground engaging tools having a second plurality of ground engaging tools coupled to the tool frame. The agricultural implement includes a front linkage assembly extending between the main frame and the tool frame. The front linkage assembly is coupled to the tool frame vertically above the front row of ground engaging tools. The agricultural implement also includes a central linkage assembly extending between the main frame and the tool frame. The central linkage assembly is coupled to a central portion of the tool frame between the front row of ground engaging tools and the rear row of ground engaging tools. The front row of ground engaging tools is configured to pivot upwardly and downwardly relative to the rear row of ground engaging tools using the front linkage assembly and the central linkage assembly.

In another embodiment, an agricultural implement includes a frame assembly. The agricultural implement also includes a front row of ground engaging tools having a first plurality of ground engaging tools coupled to a front portion of the frame assembly and a rear row of ground engaging tools having a second plurality of ground engaging tools coupled to a rear portion of the frame assembly. The frame assembly is configured to pivot during operation of the agricultural implement to facilitate contact between the rear row of ground engaging tools and a soil surface while the front row of ground engaging tools is raised above the soil surface via contact with an obstruction, and to facilitate contact between the front row of ground engaging tools and the soil surface while the rear row of ground engaging tools is raised above the soil surface via contact with an obstruction.

In a further embodiment, an agricultural implement includes a main frame configured to be coupled to a tow vehicle and a tool frame pivotally coupled to the main frame. The agricultural implement also includes a front row of ground engaging tools having a first plurality of ground engaging tools coupled to the tool frame and a rear row of ground engaging tools having a second plurality of ground engaging tools coupled to the tool frame. The agricultural implement includes an actuator configured to control a first penetration depth of the front row of ground engaging tools into soil and a second penetration depth of the rear row of ground engaging tools into soil. The agricultural implement also includes a front linkage extending between the main frame and the tool frame. The front linkage is coupled to the tool frame vertically above the front row of ground engaging tools. The agricultural implement includes a central linkage extending between the main frame and the tool frame. The central linkage is coupled to a central portion of the tool frame between the front row of ground engaging tools and the rear row of ground engaging tools. The agricultural implement also includes a spring assembly coupled to the main frame and configured to bias the tool frame relative to the main frame. The front row of ground engaging tools is configured to pivot upwardly and downwardly relative to the rear row of ground engaging tools using the front linkage and the central linkage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
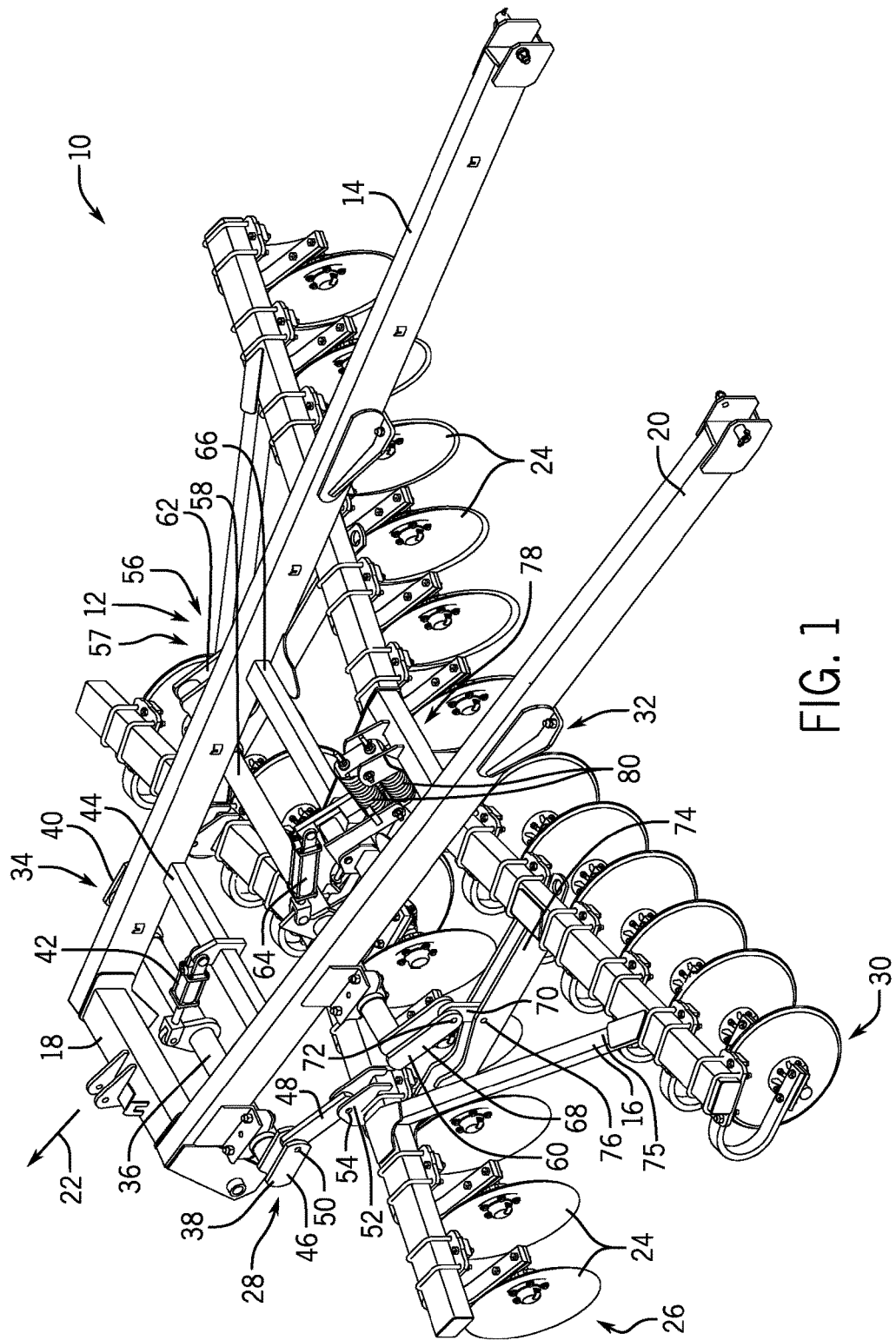
FIG. 1 is a perspective view of an embodiment of an agricultural implement with a pivoting tool frame.

Turning now to the drawings, FIG. 1 is a perspective view of an embodiment of an agricultural implement 10 with a pivoting tool frame. While one type of agricultural implement 10 is shown and described below, it may be appreciated that any suitable type of agricultural implement may incorporate the pivoting tool frame described herein to decrease a load applied to a main frame of the agricultural implement, thereby increasing the usable life of the agricultural implement. As illustrated, the agricultural implement includes a frame assembly 12 having a main frame 14 and a tool frame 16 pivotally coupled to the main frame 14. In certain embodiments, the tool frame 16 may be configured to be adjusted upwardly and downwardly relative to the main frame 14. The main frame 14 includes a front end 18 configured to be coupled to an agricultural vehicle, such as a tractor, tow vehicle, or other prime mover. Moreover, the main frame 14 includes a rear end 20 that trails behind the front end 18 as the agricultural implement 10 is pulled in a direction of travel 22 (e.g., direction of motion). As may be appreciated, the direction of travel 22 is the general direction that the agricultural implement 10 is pulled through a field to cultivate soil using ground engaging tools 24 coupled to the tool frame 16.

In the illustrated embodiment, the ground engaging tools 24 are arranged into rows. Specifically, a front row 26 of ground engaging tools 24 is coupled to the tool frame 16 in a front portion 28 of the frame assembly 12, and a rear row 30 of ground engaging tools 24 is coupled to the tool frame 16 in a rear portion 32 of the frame assembly 12. The front row 26 and the rear row 30 may have any suitable number of ground engaging tools 24. For example, the front row 26 and the rear row 30 may each have 12 ground engaging tools, as illustrated. In other embodiments, the front row 26 and/or the rear row 30 may have any suitable number of ground engaging tools, such as 2, 4, 6, 10, 24, or more ground engaging tools. Furthermore, the agricultural implement 10 may have any suitable number of rows of ground engaging tools.

The tool frame 16 is pivotally coupled to the main frame 14 to facilitate lifting the front row 26 of ground engaging tools 24 when a blade 24 of the front row 26 contacts an obstacle (e.g., a rock), and to facilitate lifting the rear row 30 of ground engaging tools 24 when a blade 24 of the rear row 30 contacts an obstacle. Accordingly, the frame assembly 12 is configured to pivot during operation of the agricultural implement 10 to facilitate contact between the rear row 30 of ground engaging tools 24 and a soil surface while the front row 26 of ground engaging tools 24 is raised above the soil surface via contact with an obstruction, and to facilitate contact between the front row 26 of ground engaging tools 24 and the soil surface while the rear row 30 of ground engaging tools 24 is raised above the soil surface via contact with an obstruction. Furthermore, the rear row 30 of ground engaging tools 24 is configured to pivot upwardly and downwardly relative to the front row 26 of ground engaging tools 24.

To facilitate pivoting of the tool frame 16 relative to the main frame 14, the frame assembly 12 includes a front linkage assembly 34 extending between the main frame 14 and the tool frame 16. The front linkage assembly 34 is coupled to the tool frame 16 vertically above the front row 26 of ground engaging tools 24, and is configured to facilitate movement of the front row 26 of ground engaging tools 24 upwardly and downwardly relative to the rear row 30 of ground engaging tools 24. Specifically, the front linkage assembly 34 includes a front rockshaft 36 rotatably coupled to the main frame 14. The front linkage assembly 34 also includes multiple members pivotally coupled between the tool frame 16 and the front rockshaft 36. The front rockshaft 36 is positioned forward of the front row 26 of ground engaging tools 24 relative to the direction of travel 22. The front rockshaft 36 is configured to rotate to move the front row 26 of ground engaging tools 24 upwardly and downwardly. For example, the front rockshaft 36 may rotate counter-clockwise to move the front row 26 of ground engaging tools 24 upwardly, and the front rockshaft 36 may rotate clockwise to move the front row 26 of ground engaging tools 24 downwardly.

The front rockshaft 36 is coupled to the tool frame 16 via a first front linkage 38 on one lateral end of the front rockshaft 36, and a second front linkage 40 on an opposite lateral end of the front rockshaft 36. The first front linkage 38 and the second front linkage 40 are coupled to the tool frame 16 vertically above the front row 26 of ground engaging tools 24. A front actuator 42 (e.g., hydraulic cylinder) is coupled to the front rockshaft 36, and is configured to drive the front rockshaft 36 to rotate. For example, a piston rod of the front actuator 42 may extend to drive the front rockshaft 36 to rotate counter-clockwise, and the piston rod of the front actuator 42 may retract to drive the front rockshaft 36 to rotate clockwise. Rotation of the front rockshaft 36 causes members of the first front linkage 38 and the second front linkage 40 to pivot and to drive the front row 26 of ground engaging tools 24 upwardly and downwardly. Thus, the front actuator 42 may drive the front row 26 of ground engaging tools 24 upwardly and downwardly relative to the main frame 14. As illustrated, the front actuator 42 is also coupled to a crossbar 44 of the main frame 14.

The first front linkage 38 includes a first member 46 coupled to the front rockshaft 36, and coupled to a second member 48. The first member 46 and the second member 48 are pivotally coupled to one another at a first pivot joint 50 via a pin or any other suitable connector. The first front linkage 38 also includes a third member 52 coupled to the second member 48 at a second pivot joint 54 via a pin or any other suitable connector. The third member 52 is also coupled to the tool frame 16. In the illustrated embodiment, the second front linkage 40 is arranged similarly to the first front linkage 38.

To facilitate pivoting of the tool frame 16 relative to the main frame 14, the frame assembly 12 also includes a central linkage assembly 56 extending between the main frame 14 and the tool frame 16 at a central portion 57 of the frame assembly 12 between the front row 26 of ground engaging tools 24 and the rear row 30 of ground engaging tools 24. The central linkage assembly 56 is configured to facilitate movement of the rear row 30 of ground engaging tools 24 upwardly and downwardly relative to the front row 26 of ground engaging tools 24. Specifically, the central linkage assembly 56 includes a central rockshaft 58 rotatably coupled to the main frame 14. The central linkage assembly 56 also includes multiple members pivotally coupled between the tool frame 16 and the central rockshaft 58. The central rockshaft 58 is disposed between the front row 26 of ground engaging tools 24 and the rear row 30 of ground engaging tools 24. The central rockshaft 58 is configured to rotate to move one or more of the front row 26 of ground engaging tools 24, the rear row 30 of ground engaging tools 24, and the tool frame 16, upwardly and downwardly. For example, the central rockshaft 58 may rotate counter-clockwise to move the tool frame 16 upwardly, and the central rockshaft 58 may rotate clockwise to move the tool frame 16 downwardly.

The central rockshaft 58 is coupled to the tool frame 16 via a first central linkage 60 on one lateral end of the central rockshaft 58, and a second central linkage 62 on an opposite lateral end of the central rockshaft 58. The first central linkage 60 and the second central linkage 62 are coupled to the tool frame 16 between the front row 26 of ground engaging tools 24 and the rear row 30 of ground engaging tools 24. In certain embodiments, the first central linkage 60 and the second central linkage 62 may be coupled closer to the rear row 30 of ground engaging tools 24 than to the front row 26 of ground engaging tools 24. In other embodiments, the first central linkage 60 and the second central linkage 62 may be coupled closer to the front row 26 of ground engaging tools 24 than to the rear row 30 of ground engaging tools 24. Still further, the first central linkage 60 and the second central linkage 62 may be coupled an equal distance from the front row 26 of ground engaging tools 24 and from the rear row 30 of ground engaging tools 24.

A central actuator 64 (e.g., hydraulic cylinder) is coupled to the central rockshaft 58, and is configured to drive the central rockshaft 58 to rotate. For example, a piston rod of the central actuator 64 may extend to drive the central rockshaft 58 to rotate counter-clockwise, and the piston rod of the central actuator 64 may retract to drive the central rockshaft 58 to rotate clockwise. Rotation of the central rockshaft 58 causes members of the first central linkage 60 and the second central linkage 62 to pivot and to drive one or more of the front row 26 of ground engaging tools 24, the rear row 30 of ground engaging tools 24, and the tool frame 16, upwardly and downwardly relative to the main frame 14. Thus, the central actuator 64 may drive one or more of the front row 26 of ground engaging tools 24, the rear row 30 of ground engaging tools 24, and the tool frame 16, upwardly and downwardly relative to the main frame 14. As illustrated, the central actuator 64 is also coupled to a crossbar 66 of the main frame 14.

The first central linkage 60 includes a first member 68 coupled to the central rockshaft 58, and coupled to a second member 70. The first member 68 and the second member 70 are pivotally coupled to one another at a first pivot joint 72 via a pin or any other suitable connector. The first central linkage 60 also includes a third member 74 coupled to the second member 70 at a second pivot joint 76 via a pin or any other suitable connector. The third member 74 is also coupled to the tool frame 16. In the illustrated embodiment, the second central linkage 62 is arranged similarly to the first central linkage 60. As shown, the tool frame 16 includes a linkage member 75.

A spring assembly 78 is rotatably coupled to the crossbar 66 and to the central actuator 64. The spring assembly 78 may be any suitable spring assembly, such as the spring assembly described in U.S. Pat. No. 4,546,832. The spring assembly 78 is configured to facilitate biasing of the tool frame 16 downwardly relative to the main frame 14. Furthermore, the spring assembly 78 is configured to facilitate biasing of the rear row 30 of ground engaging tools 24 downwardly relative to the front row 26 of ground engaging tools 24. As illustrated, the spring assembly 78 includes two springs 80.

The operation of the front linkage assembly 34, the central linkage assembly 56, and the spring assembly 78 is described in detail below. Each of these assemblies works together to facilitate movement of the front row 26 of ground engaging tools 24 relative to the rear row 30 of ground engaging tools 24. Accordingly, when an obstacle is encountered by the ground engaging tools 24, only the row of ground engaging tools 24 that encounters the obstacle is lifted above the soil surface. Accordingly, the load placed on the frame assembly 12 is reduced in half, as compared to agricultural implements in which both rows of ground engaging tools are lifted above the soil surface when an obstacle is encountered by the ground engaging tools 24. For example, the load placed on the frame assembly 12 may be reduced from approximately 8,000 pounds to approximately 4,000 pounds. Thus, the operating life of the agricultural implement 10 may be increased, and/or the cost of manufacturing the agricultural implement 10 may be reduced (e.g., by using materials that operate with lighter loads).

Figure 2:
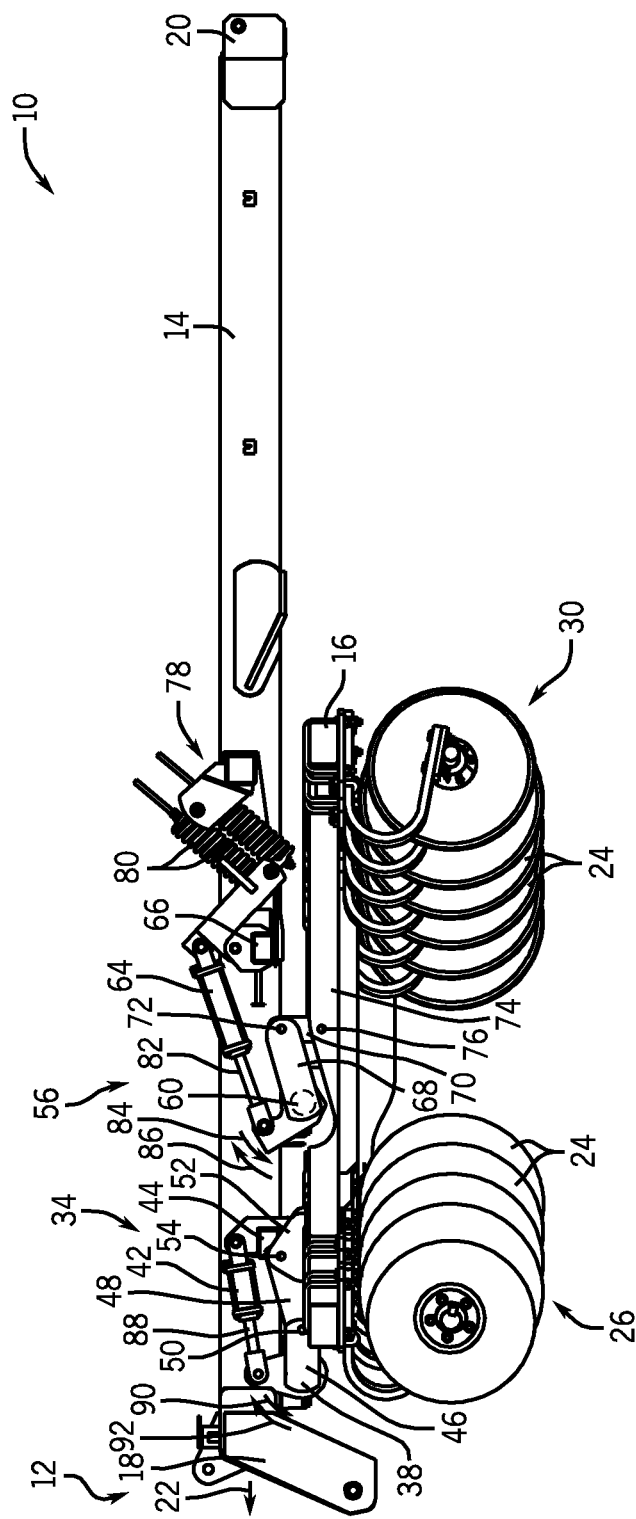
FIG. 2 is a side view of the agricultural implement of FIG. 1 with the tool frame in a raised position.

FIG. 2 is a side view of the agricultural implement 10 of FIG. 1 with the tool frame 16 in a raised position. The tool frame 16 is placed in the raised position by extending a piston rod 82 of the central actuator 64. When the piston rod 82 is extended, the central rockshaft 58 is driven to rotate in a counter-clockwise direction 84. Moreover, the counter-clockwise rotation of the central rockshaft 58 directs the first and second central linkages 60 and 62 to move the tool frame 16 toward the main frame 14 to the raised position, as illustrated. Conversely, rotation in a clockwise direction 86 directs the first and second central linkages 60 and 62 to move the tool frame 16 away from the main frame 14 to a lowered position.

Figure 3:
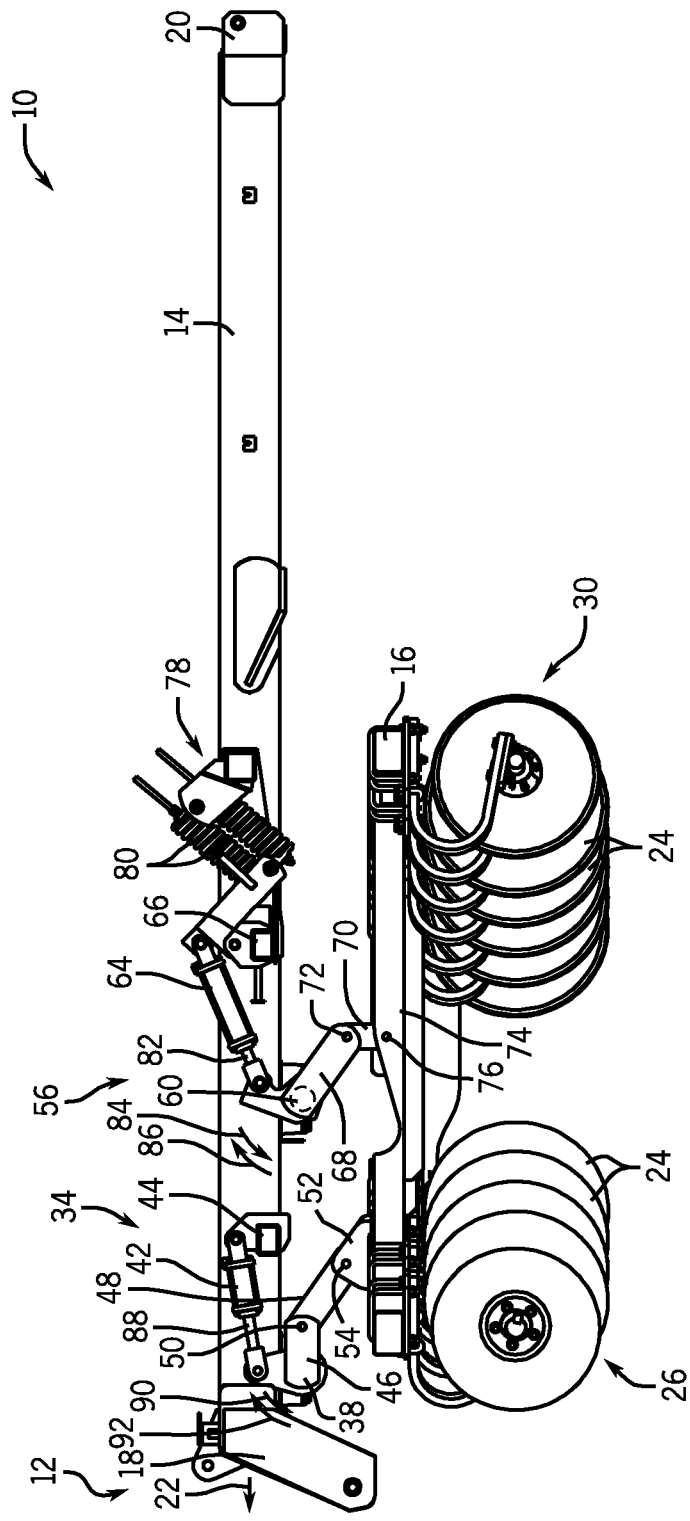
FIG. 3 is a side view of the agricultural implement of FIG. 1 with the tool frame in a lowered position.

FIG. 3 is a side view of the agricultural implement 10 of FIG. 1 with the tool frame 16 in the lowered position. When the piston rod 82 is retracted, the central rockshaft 58 is driven to rotate in the clockwise direction 86. Thus, the clockwise rotation of the central rockshaft 58 directs the first and second central linkages 60 and 62 to move the tool frame 16 away from the main frame 14 to the lower position, as illustrated. Accordingly, the central actuator 64 is used to move the tool frame 16 upwardly and downwardly between the raised position and the lowered position. As such, the central actuator 64 may be used to control a penetration depth of the ground engaging tools 24 into the soil.

The front actuator 64 may be used to control a depth of the front row 26 of ground engaging tools 24 relative to a penetration depth of the rear row 30 of ground engaging tools 24. Specifically, a piston rod 88 of the front actuator 64 may be extended to drive the front rockshaft 36 to rotate in a counter-clockwise direction 90. The counter-clockwise rotation of the front rockshaft 36 directs the first and second front linkages 38 and 40 to move the front row 26 of ground engaging tools 24 upwardly relative to the rear row 30 of ground engaging tools 24. Thus, by extending the piston rod 88 of the front actuator 64, a penetration depth of the front row 26 of ground engaging tools 24 may be decreased relative to a penetration depth of the rear row 30 of ground engaging tools 24.

Moreover, the piston rod 88 of the front actuator 64 may be retracted to drive the front rockshaft 36 to rotate in a clockwise direction 92. The clockwise rotation of the front rockshaft 36 directs the first and second front linkages 38 and 40 to move the front row 26 of ground engaging tools 24 downwardly relative to the rear row 30 of ground engaging tools 24. Thus, by retracting the piston rod 88 of the front actuator 64, a penetration depth of the front row 26 of ground engaging tools 24 may be increased relative to a penetration depth of the rear row 30 of ground engaging tools 24. Accordingly, the front actuator 64 may be used to control a difference in penetration depth between the front row 26 of ground engaging tools 24 and the rear row 30 of ground engaging tools 24. As such, an operator of the agricultural implement 10 may customize operation of the agricultural implement 10 as desired.

Figure 4:
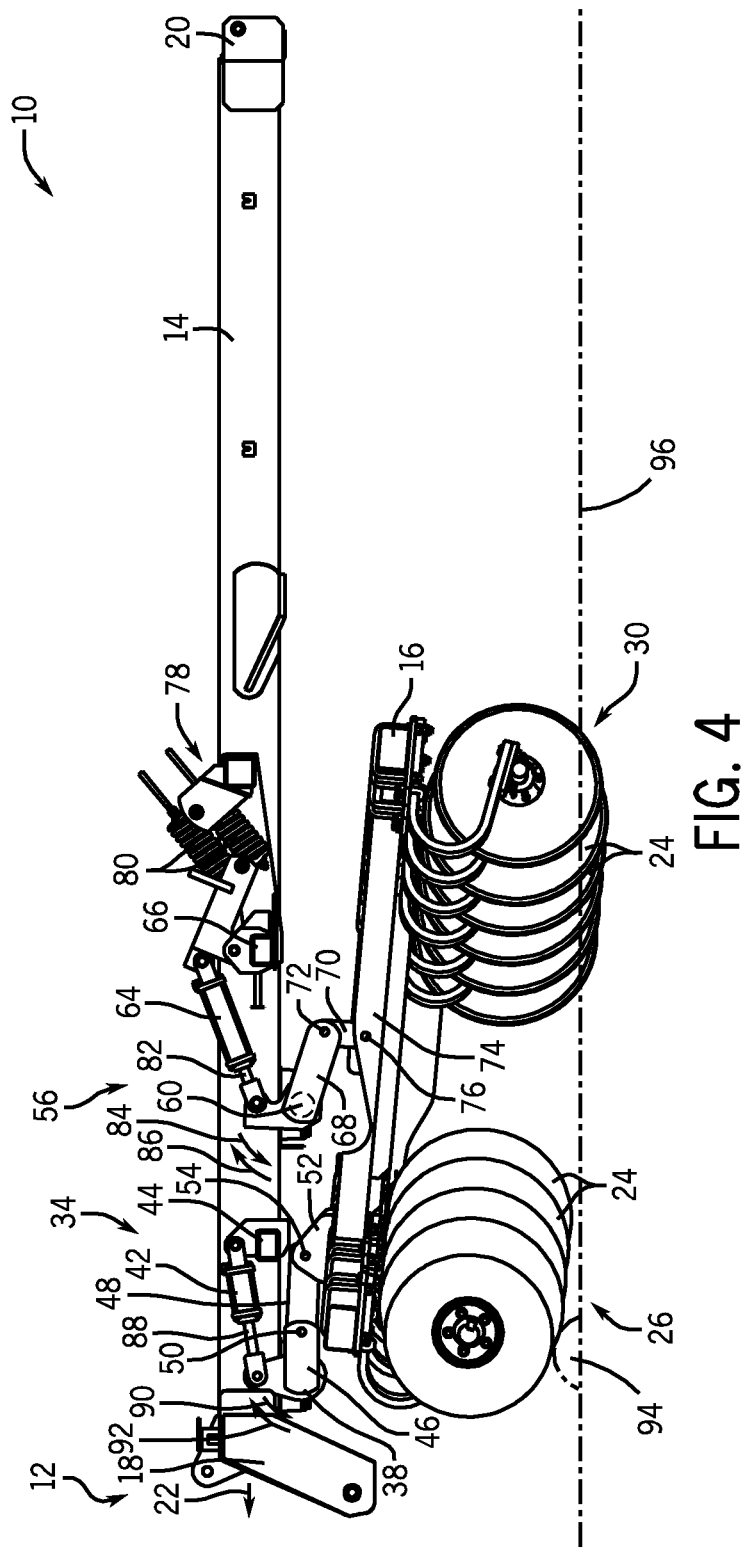
FIG. 4 is a side view of the agricultural implement of FIG. 1 with a front row of ground engaging tools contacting an obstacle.

FIG. 4 is a side view of the agricultural implement 10 of FIG. 1 with the front row 26 of ground engaging tools 24 contacting an obstacle 94. As illustrated, the tool frame 16 is in the lowered position. Contacting the obstacle 94 induces the second member 48 of the first front linkage 38 to rotate in the counter-clockwise direction 90, thereby driving the second member 48 toward the main frame 14. Furthermore, the second member 70 of the first central linkage 60 exerts a force on the central rockshaft 58 to drive the central rockshaft 58 to rotate in the counter-clockwise direction 84. Thus, as the front row 26 of ground engaging tools 24 moves over the obstacle 94, the front row 26 of ground engaging tools 24 moves above the surface of soil 96, yet the rear row 30 of ground engaging tools 24 remains in contact with the surface of the soil 96. Accordingly, the frame assembly 12 is loaded with only the weight of the front row 26 of ground engaging tools 24 and approximately half of the spring compression.

The pivoting is further facilitated by the spring assembly 78, which is shown in a compressed position. As may be appreciated, the spring assembly 78 may be uncompressed before the front row 26 of ground engaging tools 24 contacts the obstacle 94, then may be compressed for a period of time while the front row 26 of ground engaging tools 24 moves over the obstacle 94. For example, when sufficient force is exerted on the central rockshaft 58 by the first and second central linkages 60 and 62, the central rockshaft 58 rotates in the counter-clockwise direction 84 resulting in compression of the spring assembly 78. Conversely, when the torque on the central rockshaft 58 is reduced, the spring assembly 78 drives the central rockshaft 58 to its original position, and the spring assembly 78 becomes uncompressed.

Figure 5:
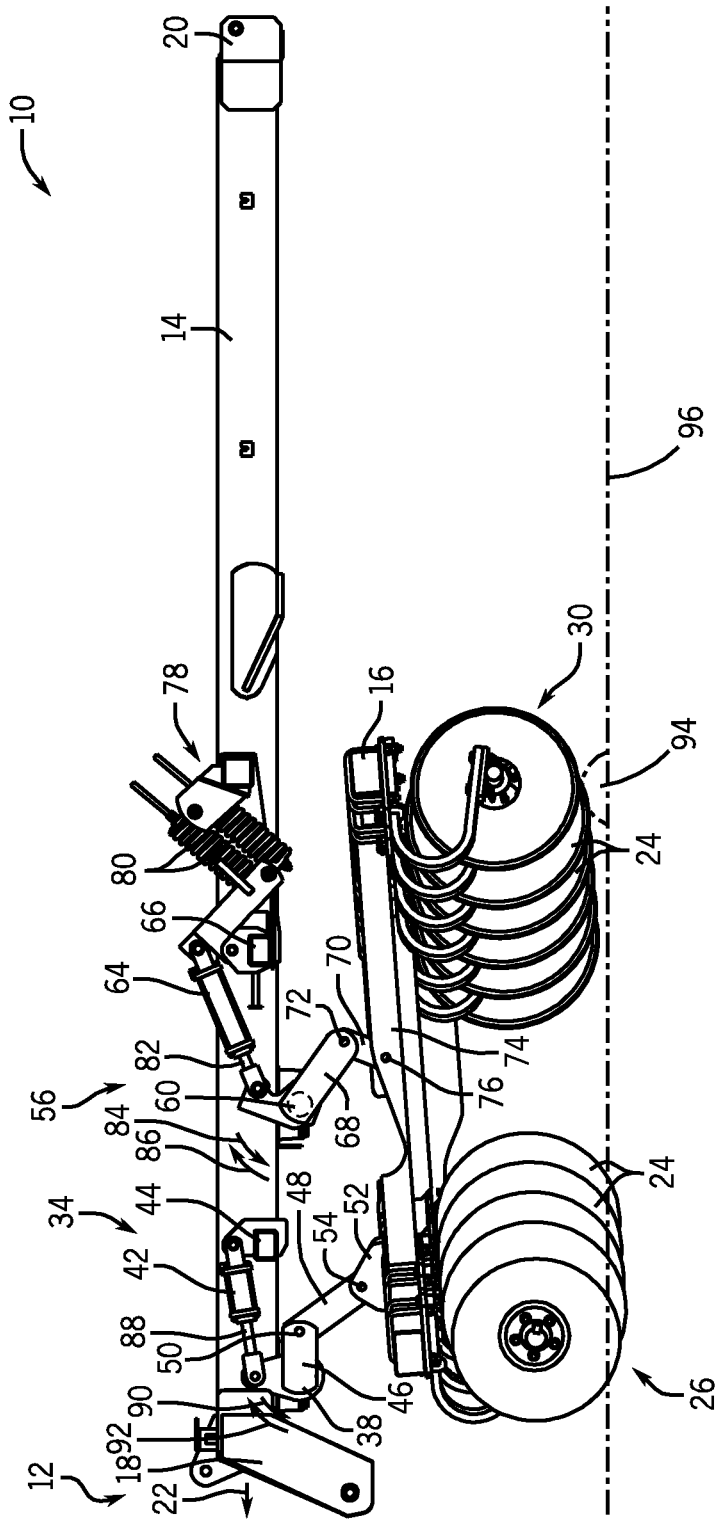
FIG. 5 is a side view of the agricultural implement of FIG. 1 with a rear row of ground engaging tools contacting an obstacle.

FIG. 5 is a side view of the agricultural implement 10 of FIG. 1 with the rear row 30 of ground engaging tools 24 contacting the obstacle 94. As illustrated, the tool frame 16 is in the lowered position. Contacting the obstacle 94 induces the second member 70 of the first central linkage 60 to rotate in the clockwise direction 86. Furthermore, the second member 70 of the first central linkage 60 exerts a force on the central rockshaft 58 to drive the central rockshaft 58 to rotate in the clockwise direction 86. Thus, as the rear row 30 of ground engaging tools 24 moves over the obstacle 94, the rear row 30 of ground engaging tools 24 moves above the surface of the soil 96, yet the front row 26 of ground engaging tools 24 remains in contact with the surface of the soil 96. Accordingly, the frame assembly 12 is loaded with only the weight of the rear row 30 of ground engaging tools 24 and approximately half of the spring compression.

Again, the pivoting is further facilitated by the spring assembly 78, which is shown in an uncompressed position. As may be appreciated, the spring assembly 78 may be uncompressed before and while the rear row 30 of ground engaging tools 24 contacts the obstacle 94. For example, when sufficient force is exerted on the central rockshaft 58 by the first and second central linkages 60 and 62, the central rockshaft 58 rotates in the clockwise direction 86 resulting in decompression of the spring assembly 78.

As described herein, the front row 26 of ground engaging tools 24 may move vertically relative to the rear row 30 of ground engaging tools 24 such that only one row of ground engaging tools is removed from the soil 96 when an obstacle 94 is contacted by the ground engaging tools 24. Accordingly, the frame assembly 12 may be loaded with only a portion of the weight of the front row 26 of ground engaging tools 24 and the rear row 30 of ground engaging tools 24 (e.g., approximately half). Thus, the operating life of the agricultural implement 10 may be increased, and/or the cost of manufacturing the agricultural implement 10 may be reduced (e.g., by using materials that operate with lighter loads).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
  a main frame configured to be coupled to a tow vehicle;
  a tool frame pivotally coupled to the main frame, wherein the tool frame comprises a forward toolbar and a rearward toolbar rigidly coupled to one another;
  a linkage member separate from the main frame, wherein the linkage member extends between the forward toolbar and the rearward toolbar and comprises a first connection point directly connected to the forward toolbar and a second connection point directly connected to the rearward toolbar to rigidly couple the forward toolbar and the rearward toolbar to one another;
  a forward row of ground engaging tools having a first plurality of ground engaging tools coupled to the forward toolbar;
  a rearward row of ground engaging tools having a second plurality of ground engaging tools coupled to the rearward toolbar;
  a forward linkage assembly extending between the main frame and the tool frame and comprising a forward rockshaft;
  a forward actuator configured to drive rotation of the forward rockshaft relative to the main frame, wherein the forward rockshaft is configured to drive the forward row of ground engaging tools upwardly and downwardly relative to the rearward row of ground engaging tools in response to rotation of the forward rockshaft;
  a rearward linkage assembly extending between the main frame and the tool frame and comprising a rearward rockshaft; and
  a rearward actuator configured to drive rotation of the rearward rockshaft relative to the main frame, wherein the rearward actuator is configured to drive rotation of the rearward rockshaft independently of the forward rockshaft, and the rearward rockshaft is configured to drive a central portion of the tool frame upwardly and downwardly relative to the main frame in response to rotation of the rearward rockshaft, wherein the central portion of the tool frame is positioned between the forward toolbar and the rearward toolbar.

2. The agricultural implement of claim 1, comprising a spring assembly coupled to the main frame and configured to bias the tool frame downwardly.

3. The agricultural implement of claim 2, wherein the spring assembly is rotatably coupled to the rearward actuator.

4. The agricultural implement of claim 1, wherein the forward actuator comprises a hydraulic cylinder.

5. The agricultural implement of claim 1, wherein the forward linkage assembly comprises a plurality of pivot joints.

6. The agricultural implement of claim 1, wherein the rearward linkage assembly comprises a plurality of pivot joints.

7. The agricultural implement of claim 1, wherein the forward linkage assembly comprises a plurality of members pivotally coupled to one another between the tool frame and the forward rockshaft.

8. The agricultural implement of claim 1, wherein the rearward linkage assembly comprises a plurality of members pivotally coupled to one another between the tool frame and the rearward rockshaft, and the rearward linkage assembly is coupled to the tool frame between the forward toolbar and the rearward toolbar.

9. An agricultural implement comprising:
- a frame assembly comprising a main frame and a tool frame pivotally coupled to the main frame, wherein the tool frame comprises a forward toolbar and a rearward toolbar rigidly coupled to one another;
- a linkage member separate from the main frame, wherein the linkage member extends between the forward toolbar and the rearward toolbar and comprises a first connection point directly connected to the forward toolbar and a second connection point directly connected to the rearward toolbar to rigidly couple the forward toolbar and the rearward toolbar to one another;
- a forward row of ground engaging tools having a first plurality of ground engaging tools coupled to the forward toolbar;
- a rearward row of ground engaging tools having a second plurality of ground engaging tools coupled to the rearward toolbar;
- a forward linkage extending from the main frame to a forward portion of the tool frame, wherein the forward linkage comprises:
  - a first member configured to be nonrotatably coupled to a forward rockshaft;
  - a second member rotatably coupled to the first member;
  - a third member rotatably coupled to the second member and nonrotatably coupled to the frame assembly;
- a rearward linkage extending from the main frame to a rearward portion of the tool frame, wherein the rearward portion of the tool frame is positioned between the forward toolbar and the rearward toolbar; and
- a forward actuator configured to drive rotation of the forward rockshaft relative to the main frame, wherein the forward rockshaft is rotatably coupled to the main frame, and the forward rockshaft is configured to drive the forward row of ground engaging tools upwardly and downwardly relative to the rearward row of ground engaging tools in response to rotation of the forward rockshaft;
- wherein the forward linkage and the rearward linkage enable the tool frame to pivot relative to the main frame during operation of the agricultural implement to facilitate contact between the rearward row of ground engaging tools and a soil surface while the forward row of ground engaging tools is raised above the soil surface via contact with an obstruction, and to facilitate contact between the forward row of ground engaging tools and the soil surface while the rearward row of ground engaging tools is raised above the soil surface via contact with an obstruction.

10. The agricultural implement of claim 9, wherein the rearward linkage comprises:
- a first rearward member nonrotatably coupled to a rearward rockshaft;
- a second rearward member rotatably coupled to the first rearward member; and
- a third rearward member rotatably coupled to the second rearward member and nonrotatably coupled to the tool frame.

11. The agricultural implement of claim 10, wherein the third rearward member extends between the forward toolbar and the rearward toolbar.

12. The agricultural implement of claim 9, comprising a rearward rockshaft configured to rotate to adjust the forward row of ground engaging tools and the rearward row of ground engaging tools upwardly and downwardly upon application of force to the rearward rockshaft by the forward row of ground engaging tools, the rearward row of ground engaging tools, or some combination thereof.

13. The agricultural implement of claim 12, comprising a rearward actuator configured to drive the rearward rockshaft to rotate, wherein a spring assembly is rotatably coupled to the rearward actuator, and the spring assembly is configured to bias the rearward row of ground engaging tools downwardly relative to the forward row of ground engaging tools.

14. An agricultural implement comprising:
- a main frame configured to be coupled to a tow vehicle;
- a tool frame pivotally coupled to the main frame, wherein the tool frame comprises a forward toolbar and a rearward toolbar rigidly coupled to one another;
- a linkage member separate from the main frame, wherein the linkage member extends between the forward toolbar and the rearward toolbar and comprises a first connection point directly connected to the forward toolbar and a second connection point directly connected to the rearward toolbar to rigidly couple the forward toolbar and the rearward toolbar to one another;
- a forward row of ground engaging tools having a first plurality of ground engaging tools coupled to the forward toolbar;
- a rearward row of ground engaging tools having a second plurality of ground engaging tools coupled to the rearward toolbar;
- a forward linkage assembly extending between the main frame and the tool frame;
- a rearward linkage assembly extending between the main frame and the tool frame, wherein the rearward linkage assembly comprises a plurality of rearward linkage members rotatably coupled to one another, wherein one of the plurality of rearward linkage members is coupled to the tool frame between the forward toolbar and the rearward toolbar; and
- a forward actuator configured to drive rotation of a forward rockshaft of the forward linkage assembly relative to the main frame, wherein the forward rockshaft is rotatably coupled to the main frame, and the forward rockshaft is configured to drive the forward row of ground engaging tools upwardly and downwardly relative to the rearward row of ground engaging tools in response to rotation of the forward rockshaft;
- wherein the forward row of ground engaging tools is configured to pivot upwardly and downwardly relative to the rearward row of ground engaging tools using the forward linkage and the rearward linkage.

15. The agricultural implement of claim 14, wherein the plurality of rearward linkage members comprise:
- a first rearward member nonrotatably coupled to a rearward rockshaft;
- a second rearward member rotatably coupled to the first rearward member; and
- a third rearward member rotatably coupled to the second rearward member and nonrotatably coupled to the tool frame.

16. The agricultural implement of claim 14, comprising a rearward actuator configured to drive rotation of a rearward rockshaft of the rearward linkage assembly relative to the main frame, wherein the rearward rockshaft is configured to drive a central portion of the tool frame upwardly and downwardly relative to the main frame in response to rotation of the rearward rockshaft.

17. The agricultural implement of claim 14, wherein the forward linkage assembly comprises the forward rockshaft and the rearward linkage assembly comprises a rearward rockshaft, and the forward rockshaft and the rearward rockshaft are configured to rotate independently from one another.

* * * * *